(12) United States Patent
Silvennoinen (10) Patent No.: US 7,755,501 B2
(45) Date of Patent: Jul. 13, 2010

(54) ENVIRONMENTAL FUSE

(75) Inventor: Mika Silvennoinen, Espoo (FI)

(73) Assignee: ABB Oy, Helsinki (FI)

( * ) Notice: Subject to any disclaimer, the term of this patent is extended or adjusted under 35 U.S.C. 154(b) by 707 days.

(21) Appl. No.: 10/587,501

(22) PCT Filed: Jan. 28, 2005

(86) PCT No.: PCT/FI2005/000054
§ 371 (c)(1),
(2), (4) Date: Jun. 5, 2007

(87) PCT Pub. No.: WO2005/074088
PCT Pub. Date: Aug. 11, 2005

(65) Prior Publication Data
US 2007/0257765 A1    Nov. 8, 2007

(30) Foreign Application Priority Data
Jan. 29, 2004    (FI) ................................. 20040129

(51) Int. Cl.
G08B 21/00 (2006.01)
G01R 31/02 (2006.01)
H01H 85/30 (2006.01)

(52) U.S. Cl. ........................ 340/638; 324/550

(58) Field of Classification Search ................ 340/635, 340/638; 324/507, 550; 335/17
See application file for complete search history.

(56) References Cited

U.S. PATENT DOCUMENTS

| | | | |
|---|---|---|---|
| 3,656,136 A | 4/1972 | Blair | |
| 4,562,723 A | 1/1986 | Hubner et al. | |
| 4,734,822 A | 3/1988 | Gilardoni et al. | |
| 5,455,549 A * | 10/1995 | Strickland et al. | 335/17 |
| 5,668,304 A | 9/1997 | Kelleter et al. | |
| 5,889,466 A | 3/1999 | Ferguson | |
| 6,218,951 B1 | 4/2001 | Colvin | |
| 7,016,166 B1 * | 3/2006 | Hou et al. | 360/324.12 |
| 2001/0020847 A1 * | 9/2001 | Mattheis et al. | 324/207.21 |
| 2002/0158776 A1 * | 10/2002 | Lash et al. | 340/984 |
| 2005/0280497 A1 * | 12/2005 | Ackerman | 337/206 |

FOREIGN PATENT DOCUMENTS

| | | |
|---|---|---|
| DE | 30 12 076 A1 | 10/1981 |
| DE | 37 02 970 A1 | 8/1988 |
| DE | 38 12 416 A1 | 10/1989 |
| WO | WO-99/52090 A1 | 10/1999 |
| WO | WO-03/058573 A1 | 7/2003 |

* cited by examiner

Primary Examiner—Jennifer Mehmood
(74) Attorney, Agent, or Firm—Birch, Stewart, Kolasch & Birch, LLP (57) ABSTRACT

The invention relates to an environmental fuse, an actuator and to an associated method for protecting the actuator from failure in a specific operating environment. The environmental fuse then comprises a sensor member for detecting any change in the environment deviating from the tolerance allowed by a specific standard, and a functional member comprising functional means for limiting or interrupting the input to said actuator and/or for giving an alarm. The actuator may also comprise an environmental fuse.

29 Claims, 4 Drawing Sheets

State = State(n,P,T,V)
State = State (Phy, Che, Bio)
n = n(HCl, SO$_4$, HS
    H$_2$O, Par, Gas,...)

ENVIRONMENTAL FUSE

The invention relates generally to the management of the operation of actuators. Specifically, the invention relates to the management of the operation of an actuator as defined in the preamble of the independent claim directed to an environmental fuse. The invention also relates to an actuator as defined in the preamble of the independent claim directed thereto. Furthermore, the invention relates to a maintenance server as defined in the preamble of the independent claim directed thereto.

Being used in a variety of applications, actuators experience different conditions in which their operation is affected not only by the load but also by the environmental operating conditions. In some cases, the operating conditions may prove to be a decisive factor for the functioning of the actuator. Certain plastics, for example, are not suitable for applications involving a high temperature.

An actuator usually ceases functioning due to mechanical wear. As an example, the bearings of a motor wear out. However, there are more factors affecting the durability and life of actuators which are problematic. Such factors are, for example, the storage temperature, operating temperature and degree of loading of the actuator as well as mechanical environmental factors such as vibrations, humidity and the effect of corrosion on the various parts of the actuator.

Besides, it has been found out that the dust content has an effect, especially on weak-current parts in actuators and their operating couplings. A high dust content may cause the settings of controllers to slip from the originally set values to totally unoptimal value ranges so that the actuator, even if the settings had been correct originally, is being run in the wrong way, unintentionally. Therefore, if there is any humidity present, problems may arise faster or there can be more of them. Because the actuator thus has to function under an additional load, its life may shorten considerably, which in a failure situation means a stoppage for the user of the actuator, and on the other hand, extra costs for the supplier of the actuator, for example, in the form of devices coverable under warranty. If the actuator is an industrial electric drive of a couple of megawatts, for example, the costs may be huge, especially if and when an interruption in use in one link of a production chain also requires stopping of the other links for practical reasons.

Figure 1:
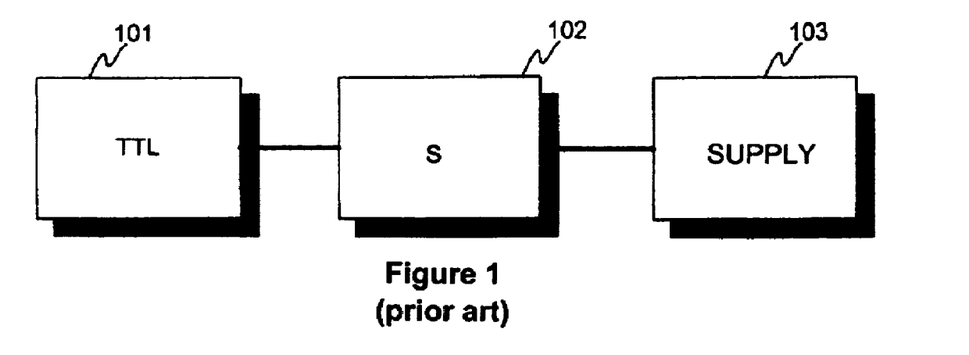

FIG. 1 shows the principle of a simple, known security device. It comprises a conventional actuator 101 protected against overcurrent by a fuse 102 in order to interrupt the supply of power. According to the known art, the fuse 102 can be an automatic fuse or, for example, a thermofuse. To the same category also belong such special arrangements that are used, for example, in coffee makers to keep the warming plate at a constant temperature.

From patent specification U.S. Pat. No. 3,656,136 it is known per se to use a sensing device in combination with an electric motor, connected to the winding thereof, to determine the resistance thereof based on an electric current running in the winding. For example, if the moisture level in the motor is too high for safe operation, a signal is generated which advises the operator of the motor not to couple the motor to the main current. According to said patent specification, the same signal also can be used to open the main current line until the motor is safely in working order.

From patent specification U.S. Pat. No. 4,734,822 it is known to use a safety device in combination with a domestical appliance to eliminate the risk of short-circuiting deriving from moisture. According to this patent specification, the safety device has two grids placed near each other and arranged to interrupt the supply of power to the domestical appliance.

The solutions of both these references surely protect the user of the apparatus, and partly the apparatus itself, in certain failure situations. However, the user of the apparatus has hardly any chance to estimate when the fault is actualized before it already has done that. The old Finnish saying "misfortune strikes without warning" crystallizes the failure predictability problems related to the known art. The solutions according to the known art that have come to the Applicant's knowledge by the date of priority do not allow a systematical assessment of the life of an actuator beforehand in a given environment.

Thus, the aim of the invention is solve the problems related with the known art or at least alleviate their impact.

The aim of the invention is achieved by means of an environmental fuse according to the invention and by using it according to the invention in combination with an actuator.

The method of protecting an actuator according to the invention is characterized by what is stated in the characterizing part of the independent claim directed to a method of protecting of an actuator.

The environmental fuse according to the invention is characterized by what is stated in the characterizing part of the independent claim directed to an environmental fuse.

The maintenance server according to the invention is characterized by what is stated in the characterizing part of the independent claim directed to a maintenance server. The actuator according to the invention is characterized by what is stated in the characterizing part of the independent claim directed to an actuator.

The operating environment of an actuator according to the invention is characterized by what is stated in the characterizing part of the independent claim directed to an operating environment of an actuator.

An environmental fuse according to the embodiments of the invention aims at interfering in the operation of the actuator in advance, before factors originating in the environment disable the actuator. The function of the environmental fuse is to prevent the actuator from starting, to interrupt and/or limit its operation so that a failure can be avoided. Not rarely, the settings of the control unit of an actuator creep due to the influence of the dust present in its environment and/or a substance present in the composition of its environment. Dust bridges in places like metal smelteries may cause short-circuits in actuators, including their strongcurrent parts. An environmental fuse according to the invention is capable of preventing the actuator from functioning when the conditions are unacceptable and/or when the settings are incorrect. According to the invention, an environmental fuse according to one embodiment of the invention is subjected to the effects of the environment of the actuator. In this case, the environmental fuse according to the invention has a sensor member for detecting a factor in the conditions prevailing in said environment.

An environmental fuse according to the invention has, in addition to the sensor member, a functional member, and one of its sensor members has a component for detecting changes in a flux passing therethrough, as well as for generating an excitation for the functional member in order to cause a given response that it is capable of causing.

An environmental fuse according to a first embodiment of the invention has a first connecting surface and a second connecting surface for feeding a flux through an active layer therebetween.

In an environmental fuse according to a first embodiment of the invention, said active layer is a medium and/or an interface thereof.

In an environmental fuse according to a first embodiment of the invention, the active layer is arranged so that a change in the flux's passing through the active layer is achieved when it is subjected to a component present in the environment.

In an environmental fuse according to a first embodiment of the invention, the change in the flux's running is a change in the opacity of the medium and/or of a layer of the interface thereof when the flux is a radiation flux.

In an environmental fuse according to a first embodiment of the invention, the change in the flux's running is a change in the resistivity of the medium and/or of a layer of the interface thereof when the flux is a current flux.

In an environmental fuse according to a first embodiment of the invention, the active layer is arranged so that it is subjected to a component present in the environment which is an aerosol, gas composition and/or a component of one of these.

In an environmental fuse according to a first embodiment of the invention, the active layer is arranged so that it is subjected precisely to said given component.

In an environmental fuse according to a first embodiment of the invention, the change in the flux serves as an excitation to trigger a response.

In an environmental fuse according to a first embodiment of the invention, the change in the flux serves as an excitation to trigger a response only when the flux falls within certain limits in the flux value range.

In an environmental fuse according to a first embodiment of the invention, the first connecting surface and the second surface for feeding a flux through an active layer therebetween are arranged in a plane-like geometry.

In an environmental fuse according to a first embodiment of the invention, the first connecting surface and the second surface for feeding a flux through an active layer therebetween are arranged in a stack geometry.

In an environmental fuse according to a first embodiment of the invention, the active layer between the first connecting surface and the second surface for feeding a flux therethrough has a given characteristic dimension.

In an environmental fuse according to a first embodiment of the invention, said characteristic dimension is based on a spark gap in an environment.

In an environmental fuse according to a first embodiment of the invention, said spark gap is sized based on an electric field and characteristic dimension in an environment.

In an environmental fuse according to a first embodiment of the invention, the active layer contains material whose electric resistivity is low, substantially of the order of a conductor.

In an environmental fuse according to a first embodiment of the invention, the active layer contains material that has a low electric resistivity at elevated temperature.

In an environmental fuse according to a first embodiment of the invention, the active layer contains material whose electric resistivity is high, substantially of the order of a dielectric.

In an environmental fuse according to a first embodiment of the invention, the active layer contains material that has a high electric resistivity at elevated temperature.

In an environmental fuse according to a first embodiment of the invention, the active layer contains material whose electric resistivity depends on the composition, biological state, chemical state and/or physical state of the environment.

In an environmental fuse according to a first embodiment of the invention, the active layer contains material having surface resistivity as the dominant component of its conductivity.

In an environmental fuse according to a first embodiment of the invention, the active layer contains material having volume resistivity as the dominant component of its conductivity.

In an environmental fuse according to a first embodiment of the invention, the active layer contains material whose electric resistivity's one component changes during subjection to a substance present in the composition of the environment.

In an environmental fuse according to a first embodiment of the invention, the active layer contains material having a low chemical resistivity.

In an environmental fuse according to a first embodiment of the invention, the active layer contains material having a high chemical resistivity.

In an environmental fuse according to a first embodiment of the invention, the active layer contains material whose chemical resistivity depends on the composition, biological state, chemical state and/or physical state of the environment.

In an environmental fuse according to a first embodiment of the invention, the active layer contains material with a low mechanical resistivity against wear.

In an environmental fuse according to a first embodiment of the invention, the active layer contains material with a high mechanical resistivity against wear.

In an environmental fuse according to a first embodiment of the invention, the active layer contains material whose mechanical resistivity against wear depends on the composition, biological state, chemical state and/or physical state of the environment.

An environmental fuse according to a first embodiment of the invention has an active layer that is arranged to be formed by means of a component present in the environment which is an aerosol, gas composition and/or a component of one of these.

An environmental fuse according to a first embodiment of the invention has an active layer that is arranged to be removed by subjecting it to a component present in the environment which is an aerosol, gas composition and/or a component of one of these.

An environmental fuse according to a first embodiment of the invention has means for forming an active layer by means of a component present in the environment which is an aerosol, gas composition and/or a component of one of these.

In an environmental fuse according to a first embodiment of the invention, said means for forming an active layer comprise a collecting arrangement that is arranged to collect a component present in the environment which is an aerosol, gas composition and/or a specific component.

In an environmental fuse according to a first embodiment of the invention, said collecting arrangement comprises a collecting substrate that is arranged for the sensor member.

In an environmental fuse according to a first embodiment of the invention, said collecting substrate thereof has a wire, dielectric substrate, conductive substrate and/or a filter.

In an environmental fuse according to a first embodiment of the invention, said collecting substrate has, in order to optimize the collecting, a shaped portion arranged in a sheet-like, stack-like, curved geometry and/or in any geometry formable as a combination of these.

In an environmental fuse according to a first embodiment of the invention, said collecting arrangement comprises means for causing a flow of a component present in the composition of the environment, and/or for regulating this flow.

In an environmental fuse according to a first embodiment of the invention, said collecting arrangement comprises a collecting substrate comprising a corrosion substrate.

In an environmental fuse according to a first embodiment of the invention, said collecting arrangement comprises a collecting substrate comprising a condensation substrate.

In an environmental fuse according to a first embodiment of the invention, said collecting arrangement comprises means for forming the active layer by means of a corrosion substrate and/or another collecting substrate.

In an environmental fuse according to a first embodiment of the invention, the active layer is formed by means of a corrodable wire and/or strip.

In an environmental fuse according to a first embodiment of the invention, said wire and/or strip may have a rectangular, round and/or, in part, polygonal cross-section.

In an environmental fuse according to a first embodiment of the invention, said wire and/or strip is shaped in order to shape the electric field.

In an environmental fuse according to a first embodiment of the invention, said active layer, or a portion thereof, such as a portion of the wire and/or strip, may comprise means for bringing a component present in the environment into conjunction with the active layer, using the collecting arrangement.

In an environmental fuse according to a first embodiment of the invention, said collecting arrangement is based on collecting a component present in the environment onto the collecting substrate through diffusion, electric interaction, impaction, interception and/or deposition.

According to a second embodiment of the invention, a group is formed from environmental fuses according to the first embodiment.

The group according to the second embodiment of the invention has a first environmental fuse and a second environmental fuse.

The active layer of the first environmental fuse of the group according to a second embodiment of the invention is constituted by a first active layer.

The active layer of the first environmental fuse of the group according to a second embodiment of the invention is constituted by a second active layer.

Said first active layer and said second active layer in a group according to a second embodiment of the invention are different from each other.

In the group according to a second embodiment of the invention, the first active layer is arranged so that by subjecting it to a first component present in the environment a first change is achieved in the flux's passing through said first active layer.

In a group according to a second embodiment of the invention, the second active layer is arranged so that by subjecting it to a second component present in the environment a second change is achieved in the flux's passing through said second active layer.

In the group according to a second embodiment of the invention, said first change in the flux serves as a first excitation to trigger a first response.

In the group according to a second embodiment of the invention, said second change in the flux serves as a second excitation to trigger a second response.

In a group according to a second embodiment of the invention, in which a first environmental fuse and a second environmental fuse are contained, they are arranged so that a first time period between the moment that the first active layer is subjected a component present in the environment and the moment that the first response is triggered in the first environmental fuse is of different length than a second time period between the moment that the second active layer is subjected a component present in the environment and the moment that the second response is triggered in the second environmental fuse.

In a group according to a second embodiment of the invention, the first environmental fuse and the second environmental fuse are parallel-connected so that the flux passing through the active material layer in each environmental fuse is substantially independent of other fluxes.

In a group according to a second embodiment of the invention, the first environmental fuse and the second environmental fuse are series-connected so that the flux passing through the active material layer in each environmental fuse is substantially the same flux.

In a group according to a second embodiment of the invention, the first and the second environmental fuse have a common sensor member component and/or functional member.

In an environmental fuse according to a first and/or a second embodiment of the invention, the functional member is arranged to execute a function in response to an excitation from the sensor member of the environmental fuse.

In an environmental fuse according to a first and/or a second embodiment of the invention, the functional member is arranged to execute a function in order to restrict the value of a current-dependent quantity completely, to a lower or higher level than a given limiting value, in one part of the actuator.

In an environmental fuse according to a first and/or a second embodiment of the invention, the functional member is provided with means capable of executing a message function.

According to an embodiment of the invention, said message function is an alarm.

The alarm may be local, intended for the maintenance personnel in the operating environment of the actuator, and/or a remote alarm intended for the factory where the actuator was manufactured, for example.

According to one embodiment of the invention, said message function is recordable in a register and/or database.

The sensor member of an environmental fuse according to a first and/or a second embodiment of the invention comprises an integrated sensor having, in all, at least two sensors according to the first and/or second embodiment of the invention.

According to an embodiment of the invention, the sensor has components with a combined function.

In an environmental fuse according to a first and/or a second embodiment of the invention that is provided with an integrated sensor, each of its sensor members is arranged to give an excitation based on the content of a component present in the composition of the environment.

According to a third embodiment of the invention, an actuator according to the invention has an environmental fuse according to the first and/or second embodiment.

An actuator according to a third embodiment of the invention comprises an electric drive, power supply, drive control, pump, fan and/or a preferred combination of these.

According to a third embodiment of the invention, an actuator having an environmental fuse according to an embodiment of the invention has the sensor member of this environmental fuse arranged to simulate a failure of said actuator before the actuator itself fails.

An environmental fuse according to an embodiment of the invention comprises authentication means to prove how, where and/or how long said environmental fuse has been combined with the actuator.

According to an embodiment of the invention, said authentication means comprise a memory in the environmental fuse and/or in the actuator.

As FIG. 1 illustrates a fuse arrangement according to the prior art, the invention will be described in the following with reference to the drawings in which.

Other embodiments of the invention are described in the dependent claims.

It should be noted that the Figures are non-restrictive and serve only to illustrate some embodiments of the invention. Furthermore it is stated that the dimensions used in the Figures are only illustrative and may thus differ considerably from the real, actual dimensions of the objects shown in the Figures. In FIGS. 2 to 9, like numerals are used to refer to like parts in each Figure. However, the purpose of this is not to disallow the possibility of arranging the parts referred to by these numerals, where applicable, in a somewhat different way in the Figures in order to consider the special features of the embodiment of each Figure. Various embodiments of the invention can be combined in mutually compatible part.

Figure 2:
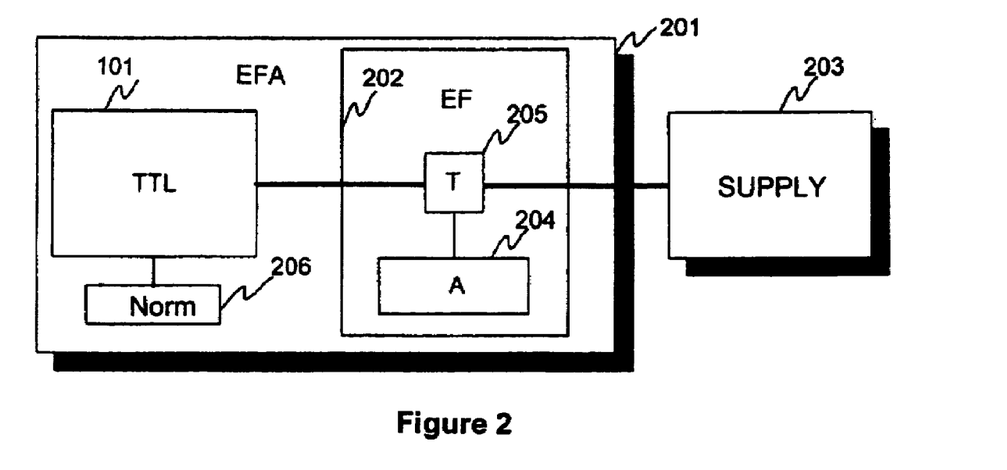
FIG. 2 is a schematic view of an environmental fuse according to the invention.

FIG. 2 shows an actuator 201 according to an embodiment of the invention. It has an environmental fuse 202 connected to an actuator member 101 which may comprise a conventional actuator 101 as shown in FIG. 1, intended to be used in a way according to a norm 206 in a given operating environment. The conventional actuator 101 may accord the art known per se. FIG. 2 also shows a supply 203 to keep said actuator 101 operating. The supply 203 can be a supply that is directly necessary in the operation of the actuator 101 and that is limited or interrupted to keep the actuator in working order. Alternatively, the supply 203 may be a supply that maintains operation indirectly. In FIG. 2, the supply 203 may thus comprise a supply that is arranged to supply electric current, compressed air, gas, liquid, aerosol and/or some other fluid termed feedable. Consequently, fluid supplies, used for feeding a lubricant, for the purpose of cooling and/or heating the actuator, for example, may also be included in the supply 203. By doing so, gathering of cooling water or lubricant, for example, in the structure of a non-functioning device can be avoided. Furthermore, the supply 203 may comprise a supply of information in accordance with the norm 206 in order to supply information concerning the operation of the environmental fuse. The supply 203 may comprise a feedback so that a quantity measuring an amount and/or a quality supplied in the supply can be set within a desirable value range, e.g. at a value defined according to the norm 206.

The norm 206 most preferably defines such factors for the actuator member 101 of the actuator that affect the operation of certain parts thereof. Generally speaking, the purpose of the norm 206 is ensure that the right actuator is chosen, that the actuator operates in the right environment and/or in the right conditions, so as to allow the user of the actuator to benefit maximally from the device. More particularly, the purpose of the norm 206 is to present the equivalent of such actuator-related structural and/or material choices that affect the operation, the duration of the operation and the way of operation of said actuator in an environment (301 in FIG. 3) having a composition defined in the norm 206. Correspondingly, the norm 206 may present several environments if the operation, the duration of the operation and/or the way of operation of said actuator 101 vary between different environments. In this case it is preferable to use classified environments wherein the classification criterium may be, for example, the correlation between the composition of an environment and the actuator's tendency to fail relative to the materials and/or structure of the actuator. The norm may include actuator specific, even actuator part and/or environment specific, definitions of the above-mentioned equivalents which may serve as the classification criterium. In other words, the norm may comprise a classification. For a better understanding of the composition of an environment, reference is made to FIG. 3 and its description. According to the basic idea of the invention for each above-mentioned factor affecting the state of the operating environment, an environmental fuse can be produced in which the excitation from the sensor member is arranged as defined in a norm 206. In the classification of environments by their compositions, tolerances can be used to denote a class and/or a class frontier in the norm.

An environmental fuse 202 according to an embodiment of the invention has a sensor member 204 and a functional member 205 as shown in FIG. 2. The sensor member is arranged to cause triggering of the environmental fuse before the actuator fails, according to statistical probability, in a use according to the norm. In practice, this may result in that said actuator does not even start if the environment is unacceptable and deviates from the tolerances of the norm. Most preferably, the sensor member is arranged to sense deviations from the tolerances of a given norm 206. The function of the sensor member 204 is to sense, using electro-chemical-mechanical principles, such deviations in the composition and/or state of an environment that may disable the actuator 101, either in the short run and/or in the long run, either directly or indirectly. Most preferably, the sensor member 204 is arranged to give an excitation to the functional member 205 when there is a sufficient deviation in the composition of an environment.

In response to the excitation, the functional member 205 most preferably limits and/or interrupts the supply 203 so that the actuator does not start before it has been serviced or before it has been checked whether the actuator matches with the conditions of its intended operating environment. Using the functional member 205, functions that are activated based on said excitation may be added to the response. Examples of such functions are cooling and/or regulation of the amount of the lubricant in an overheating situation. Besides, there may be a number of responses graded according to the supply for a safe shut-down of the actuator.

According to an embodiment according to the invention, the environmental fuse 202 may be based, for example, on the idle-current principle whereby the end of the flux's running from the sensor member acts as an excitation to the functional member 205. According to another embodiment of the invention, the sensor member gives an electric signal as an excitation to the functional member 205.

Figure 4:
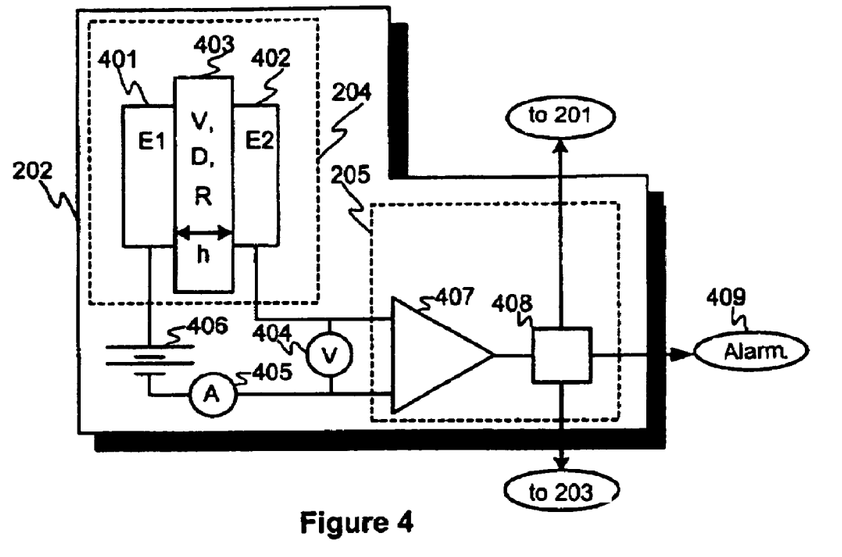
FIG. 4 illustrates the structure of a simple environmental fuse according to an embodiment of the invention.
Figure 5:
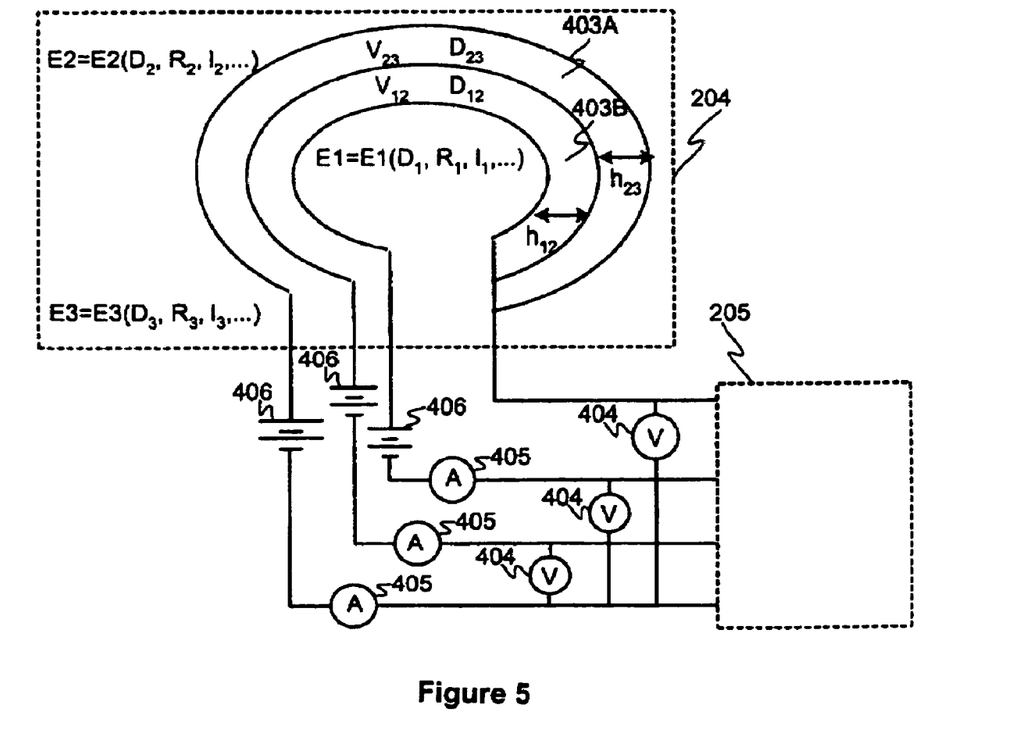
FIG. 5 illustrates the structure of an integrated environmental fuse according to an embodiment of the invention.

In a preferred embodiment of the invention, the sensor member 204 is implemented as a sensor member 204 having a component (cfr. FIGS. 4 and 5) that reacts to such deviation in the composition of the environment that falls outside the limits, i.e. tolerances, of the norm 206. According to a simple embodiment according to the invention, said component of the sensor member can be, for example, an active layer that dissipates at a given temperature and/or pressure, through evaporation or corrosion in a given time period, thereby interrupting the idle-current flux, for example. As a result, the functional member 205 responds to the excitation and, for example, interrupts the supply of electricity from the supply 203 to the actuator 201 or to component thereof.

In this case, the norm 206 may define a minimum time period proportional to the conditions prevailing in the environment during which the active layer should still exist and during which the current flux still can run through the active layer, and, in addition, where necessary, a maximum time period during which the active layer should be checked at the latest.

Figure 3:
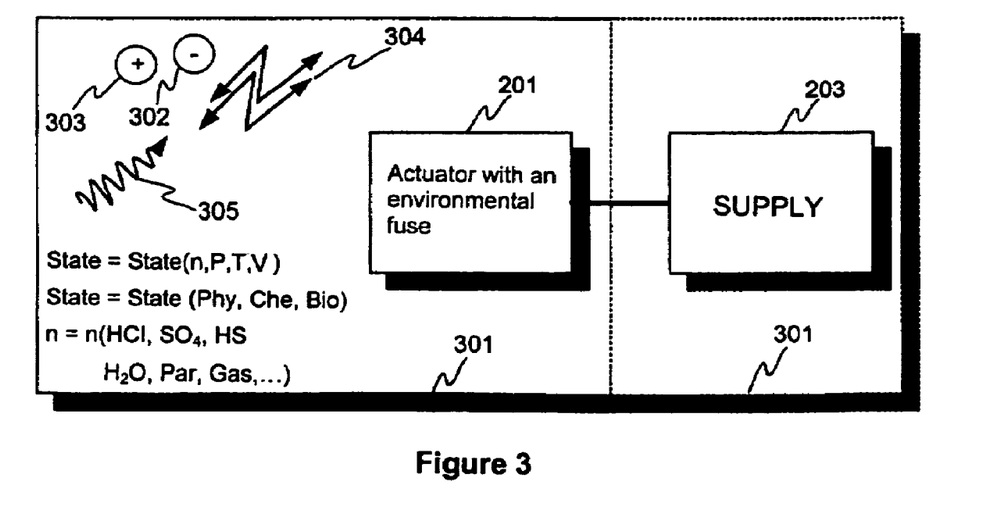
FIG. 3 illustrates the operating conditions of an actuator according to the invention.

In the following, FIG. 3 is examined as an introduction to the various embodiments of the invention. FIG. 3 shows an actuator 201 provided with an environmental fuse according to an embodiment of the invention in a given operating environment. Said actuator 201 also has a supply 203, which may be located in the same operating environment or in its own separate operating environment, as is illustrated by the dashed line between the actuator 201 and its supply 203. Both operating environments are denoted by numeral 301, but said operating environments may each be optimized according to their own norms.

In FIG. 3, the operating environment 301 comprises factors that constitute the state of the operating environment 301. The presented equation State=State (Phy, Che, Bio) illustrates the nature of the state-affecting factors in view of the norm 206 and means that the operating environment contains physical (Phy), chemical (Che) and/or biological (Bio) factors measurable by means of quantities that can be associated with a change in the flux in the active layer when the state changes. The biological factors can be factors that have a direct influence on the growth or operation of micro-organisms present in the operating environment.

Another division of the factors affecting the state of the operating environment 301 in view of the norm 206 is achievable by describing the state by means of the following equation: State=State (m, P, T, V). The state of the operating environment can now be described by means of quantities which include, for example, the properties of the medium V of the operating environment and its composition as well as the pressure P and temperature T of the operating environment and which can be associated with a change in the flux in the active layer when the state changes.

In the composition of the medium, toxic gas (HS), corrosive gas (e.g. HCl), radical ($SO_4$) and/or ion, moisture ($H_2O$), particle (Par) and/or other gas (Gas) contents in the operating environment can be considered in view of the norm 206. Other factors affecting the composition of the environment can also be considered, such as the states of its components and/or their transformations between phases which occur when some of the parameters, such as P, T, vary. Furthermore, factors like electricity 304, ion content (negative ions 302, positive ions 303, according to their special sort) as well as radiation balance 305 can be considered. By "radiation balance" is meant the radiation dose to which that part of the actuator which the environmental fuse should protect is subjected through particle and/or electromagnetic radiation. In radiation balance, a dose of radiation in the form of environmental radiation comprising ionizing radiation, particle radiation and/or electromagnetic radiation can be considered. Where applicable, radiation balance can also be based on the distribution of electromagnetic radiation in a frequency range, on the location-based and/or time-based distribution of radiation in the operating environment of the actuator.

FIG. 4 shows an environmental fuse 202, in combination with an actuator 201 according to the invention, whose simplest embodiments become evident from FIG. 4. The environmental fuse 202 has a sensor member 204 with a first connecting layer 401 and a second connecting layer 402 having an active layer 403, which also can consist of the medium V (or be a vacuum in certain cases), therebetween.

In FIG. 4, the active layer 403 of the sensor member 204 is shown to have, by way of example, a characteristic dimension, thickness h, a resistivity R and a resistance determined by them. By resistance is meant electric resistance unless stated otherwise. Furthermore, it is pointed out that a given resistance over the distance of a material covered by the characteristic dimension is achievable based on the characteristic dimension and resistivity of the material.

FIG. 4 also shows a diffusion constant D on a surface of the active layer 403 for components coming from or dissipating to the environment (301 in FIG. 3 but not shown in FIG. 4). The sensor member 204 of FIG. 4 is arranged to measure a voltage 404 and/or current 405 from a power supply 406. It is obvious on the basis of FIG. 4 to a person skilled in the art to find alternative ways of determining the voltage and/or current between the connecting layers 401 and 402 as in FIG. 4. Besides, on the basis of FIG. 4 it is obvious that a person skilled in the art finds, also, an alternative way of connecting the power supply so that that a definable electric current can be passed through the active layer 403 via the connecting layers 401 and 402.

Although the power supply 406 is denoted by a symbol that usually is associated with a battery or a similar DC supply, the power supply 406 can comprise an AC supply, where applicable. In this case, its voltage and/or current has a wave form suitable for the application. Said voltage and/or current each has an amplitude and/or frequency related to the wave form, and, possibly, a bias value that can be other than zero. The voltage or current may also have a certain phase difference. AC current may have one other frequency component or other frequency components in addition one frequency component. The frequency can be, for example, a network frequency, or a multiple thereof, but also very high, even a radio frequency. Thus, when AC current is used, the resistivity of the material of the active layer of the sensor member is chosen such as to generate a suitable impedance, the impedance having resistance, inductance, capacitance and/or a combination thereof as its components. According to one of the above-mentioned preferred embodiments, the impedance may be generated, where applicable, individually in each case, based on a given frequency. Thus, a change caused in the impedance of the active layer by the composition of the environment can be used to indicate changes and/or deviations in the composition of the operating environment, based on the AC current's frequency, for example. The changes and/or deviations are detectable as weakening/strengthening of a given frequency component's amplitude through the active layer, in comparison with a reference amplitude that can be a previous amplitude of the frequency and/or of another frequency. The comparison can be of a longitudinal type, based on a change between two timewise successive situations in the same operating environment of the actuator, and/or of a transverse type, based on a change between the operating environment and a given comparison norm.

According to an embodiment of the invention, the layers 401, 402 and 403 can be used, where applicable, to form such components as coils, capacitors and/or resistors in the sensor member, in an environmental fuse according to an embodiment of the invention. In this case, the material choices for each layer 401, 402 and 403, or other corresponding layers (in a combination sensor, for example), can be made by the electric current type (DC and/or AC), frequency and/or wave form that suits best for the operating environment of the actuator. The choice of a material for each layer can be based on said material's resistivity, characteristic dimension, diffusion constant for a component of the composition of the operating environment, its rate of corrosion in the operating environment and/or on another detail/quantity stated in a norm concerning the operating environment.

Actually, any number of said coils, capacitors and/or resistances can be arranged in the sensor member without limitations, in order to produce a given impedance for an AC current of a given frequency that as a wave form. It therefore becomes possible to create, for example, filters and/or resonators whose frequency changes under the influence of the environment, the change being usable to give an alarm. Thus, different components can be used to give an alarm according to a different norm, in different parts of each sensor member, of a combination sensor, for example.

FIG. 4 is a schematic view of the sensor member showing it in exaggerated dimensions which may differ considerably from the stated ones, these dimensions being not necessarily of the same order with each other. However, the components of the sensor member are dimensioned so that changes in an environmental composition corresponding to a given norm result in the generation of a response in the sensor member, at a given moment after the sensor was taken into use, when it is placed in its operating environment. Based on FIG. 4, a stack-like and/or plane-like sensor geometry can be described, depending on the viewing direction. In the stack-like geometry, the layers, such as the connecting layers 401, 402 and/or the active layer 403, are placed like the cards of a pack of cards, resting one on another, at least partially. In the plane-like geometry, the layers are placed next to each other, like cards on a table. The possibility that the layers are placed partly next to each other and, at the same time, partly one on another according to the stack geometric embodiment, is not excluded.

Although the components 401, 402 and 403 of FIG. 4 are drawn in the same plane on a paper, according to the plane-like sensor geometry, FIG. 4 also illustrates a stack-like sensor geometry in which of the components 401, 402 and 403 only the cross-section of the pack formed by them is shown, meaning that said components can be strip-like or sheet-like, lying one on another but perpendicularly to the plane of the paper. In the stack-like geometry, the components 401, 402 and/or 403 may overlap each other, where applicable, in order to optimize the surface of the active layer 403 for a given collecting application.

The sensor member 402 can be plane-like, in which case h denotes a characteristic dimension, the width of the active layer 403 in the first place, such as the distance between circuit board strips or the distance between certain winding parts in the sensor member. The medium V consists of air or an equivalent fluid between the strips, but, on the other hand, of the circuit board material which usually is a dielectric. Alternatively, the medium V of the sensor member can consist of a material to which a given resistivity has been arranged for a given application. This resistivity may also be lower or higher than that of the application specific dielectric itself. Hence, the medium V may comprise the medium of the environment.

The sensor member 202 can also be stack-like, in which case h denotes a characteristic dimension which can be the thickness or length of the active layer 403. It is therefore possible that the active layer is, for example, a wire having a length h set between the connecting layers 401 and 402. A disc-like piece whose thickness exceeds its length can thus be mentioned as an extreme example of a wire.

The wire may have a portion that has a straight, helical or another shape, in order to provide a given characteristic dimension. The connecting layers 401 and 402 are most preferably arranged to create a galvanic connection with the active layer 403. Besides, the connecting layers 401 and 402 are connected with a component 407 so that an electric current and/or voltage passing through/over the layer 403 can be measured.

The wire may also be arranged into layers consisting of materials that each have a different resistivity, which makes it possible to observe the wear/corrosion of the wire based on changes in the electric current running through the wire. As an example, the innermost layer of the wire may consist of a high resistivity dielectric, while each layer of the next layers towards to the outer surface may have a resistivity that differs from the resistivity of the preceding layer. Thus, the resistivity may decrease layer by layer towards the outer surface so that the variation of resistivity shows in the electric flux passing through the active layer with the wear of the outermost layer of the active layer. The above-described layered structure may also be applied to stack and/or plane geometric active layers which are intended to corrode under the influence of component and/or factor present in the composition of the environment.

The corrosion can be arranged to take place in the sensor member with the aid of a corroding material that has a low chemical resistance to a given component present in the composition of the environment, as a result of which, when an exception to a norm is made and it becomes part of this environment in which the sensor member is operating, this material of the sensor member corrodes; but, when no exception is made to said norm and the composition of the environment does not contain said component, no corresponding corrosion of the sensor member occurs.

The functional member 205 has an element 407 that is arranged to detect changes in the electric current's passing through the active layer 403 and/or voltage changes in the voltage between the connecting layers 401 and 402. In an embodiment of the invention, the element 407 may alternatively be comprise means for detecting radiation that is arranged to pass through the active layer 403.

In this case, the changes may be based on, for example, a chemical change in the active layer 403, causing a change in its 403 conductivity properties. Alternatively, the change can take place, for example, in the form of saturation of a portion of a surface and/or volume of an suitably arranged active layer with a given substance present in the environment, at first mainly mechanically. Said substance can also react with the active layer 403, thereby changing its resistivity (surface and/or volumetric resistivity) and, consequently, the electric resistance of the active layer. Thus, the process leading to a change deviating from the tolerances of the norm 206 is quite slow when compared to the blowing of a blowing fuse according to the known art, for example.

The substance present in the environment, which is intended to saturate the active layer in the above-mentioned case with time, can be, for example, a gas, a component thereof, a radical carried therein, an ion and/or a component of an aerosol, as shown in FIG. 3, for example. Therefore, the time it takes from a layer with a given thickness/width (h) to saturate to the degree that it generates an excitation to trigger the environmental fuse, depends not only on factors like the content of the substance in the environment and/or the substance's diffusion constant D into the structure of the active layer, but also on how the medium flows in relation to the sensor member and/or the boundary layer of its surface. The dimensions and/or material choices as well as surface roughness of the environmental fuse may thus be critical to how fast said excitation to trigger the environmental fuse can be generated in a given environment according to the norm and for the tolerance corresponding thereto.

According to an embodiment of the invention, the components 401, 402 and 403 can be arranged such that one of said components 401, 402 and 403 evaporates and/or corrodes away, thereby allowing said excitation-generating current 405 to weaken down to a given limit before it is cut off substantially completely with the result that the element 407 generates, based on the cut-off or limit, an alarm 409, and/or the component 408 interrupts the supply 203 to the actuator 201. This makes it possible to detect, for example, a sudden change in the state of the environment as a result of overheating, for example.

When a change, whether a sudden change or a change taking place during a long period (cumulatively), in the composition and/or state of the environment is sufficient to generate an excitation, to cause a quantity describing the operating environment, such as a quantity mentioned in the explanation of FIG. 3 and affecting the state of the environment, to deviate from the tolerance of the norm 206 (not shown in the Figure), the element 407 is arranged to cause, in response to the excitation caused by the deviation from the tolerance, for example, limitation and/or interruption of the supply 203 to the actuator 201 via the component 408.

When shutting down large, such as industrial-scale actuators, the supplies 203 cannot be interrupted directly but it is sometimes preferable to shut them down softly, by limiting the supply first before it is interrupted entirely. In some cases, different supplies 203 must have a their own shut-down orders. As an example, if an electric motor has an air bearing and the air bearing has a power supply to maintain the air bearing, it is usually unwise to cut off the power which is supplied to maintain the air bearing until the motor has stopped in other respects. Thus, an environmental fuse according to this embodiment of the invention allows to take into account the special needs related to the example and to use multi-stage interruption of the supply. According to one embodiment of the invention, the functional member 205 also can give an alarm 409, which is discussed more thoroughly in conjunction with FIG. 6 and/or FIG. 9.

A first hypothetical example is given in which a standard actuator is protected by an environmental fuse according to one embodiment, which is the first or the second embodiment, of the invention. The actuator may also be an actuator according to one embodiment of the invention that already has an environmental fuse combined or integrated with it. According to the example, the actuator has insulations which a long-term durability in normal indoor air but which, for example, in air with a HCl content of 30 ppm do not endure no longer than 6 years when an insulation structure according to which the manufacturer of the actuator has built the actuator is used. The sensor member of the actuator has an active layer 403 in the form of a membrane, for example. The thickness, width and material of the membrane are dimensioned such as to make the membrane endure over 1000 years in an environment whose composition is similar to the composition of normal air before the sensor member generates an excitation due to oxidation and/or corrosion. When the same sensor member is taken to an environment with a HCl content of 45 ppm (parts per million) in its composition, it only takes 4 years from the membrane to wear out with the result that the sensor member generates an excitation and the functional member of the environmental fuse generates a response and interrupts the supply to the actuator. The environmental fuse preferably then remains in a state that prevents its actuator from starting before it is serviced and/or before the reason for the interruption is found out. Because the environmental fuse has been triggered, the operator realizes that he has to check the insulations and take action to replace the insulations with new ones before the device is burned as a result of a short-circuit. If the actuator is not provided with an environmental fuse according to the invention, it may function as long as for six years, but then the user does not get off with a service but he may have to buy a new actuator.

A second hypothetical example is similar to the above-given example but the user has placed the same actuator in an environment with a HCl content of 150 ppm in its composition. In this case, the same environmental fuse is triggered after 1 month, for example, and the whole device within 3 months during the warranty time period. The user of the actuator is not entitled to demand a new actuator from the manufacturer of the actuator by referring to the warranty of the product because the user himself has placed the actuator in an inappropriate environment, provided that the actuator had an environmental fuse according to an embodiment of the invention.

In a third hypothetical example, the situation is similar to that of the second hypothetical example but three environmental fuses are combined with the device, each being set to operate according to a different norm but to be triggered within an equally long period of time. The first, second and third environmental fuse are set to be triggered within one month in an environment that has a HCl content of 200 ppm, 100 ppm and 25 ppm in its composition, respectively. Thus, the manufacturer of the device knows, based on an environmental fuse according to an embodiment of the invention, that the device has been used in environmental conditions that are quite unsuitable for the structure of the device and can take this into account when delivering a next device to the same customer.

In a fourth hypothetical example, the situation is similar to that of the first hypothetical example but the environmental fuse is arranged to have zero tolerance for HCl. If the user of the actuator tries to use it in a hydrochloride acid plant, contrary to the norm of the operating environment, the actuator does not start at all. Consequently, the manufacturer of the device need not to deliver a new similar actuator to the user as a warranty replacement of an actuator destroyed during the warranty period.

In a fifth hypothetical example, an actuator according to the fourth example is given the proper function and placed in an acceptable environment, but an accident happens at the factory, as a result of which a combination of changes takes place in the physical, chemical and biological state of the environment of the actuator, raising the HCl content so high that the environmental fuse according to the invention causes a shutdown of the actuator in response to the above-described change in the environment.

Although HCl is mentioned in the above-given examples, an equivalent and/or another norm can be established for the other substances, and/or for combinations thereof, stated in conjunction with FIG. 3. As an example, water can exist in the form of steam and/or drops in the environment but it may be condensable into liquid on the surface of a collecting substrate, in which case this gathering of water under conditions according to the norm is taken into account in the sensor member and/or collecting substrate.

An alternative way of implementing an environment-related according to a first embodiment of the invention is to arrange the active layer 403 of the sensor member 204 thereof to react to a radiation flux passing therethrough when the state of the environment changes. In this case, the connecting layer 401, for example, has to be in contact with transmission means in order to generate a radiation flux through the active layer 403. Correspondingly, the connecting layer 402 has to be in contact with reception means in order to receive the radiation flux passing through the active layer 403. The component 407 is arranged to allow measuring of changes in the radiation flux passing through the active layer 303 in order to generate an excitation. In addition, the connecting layer 401 may comprise transmission means and reception means according to the backscattering geometry, the connecting layer 402 being able to act only as a reflector for reflecting the radiation flux transmitted from the transmission means towards the reception means.

According to an embodiment of the invention, the connecting layer 401 has at least one of the transmission means and reception means integrated with the connecting layer 401. According to one embodiment of the invention, the connecting layer 402 has the reception means integrated with the connecting layer 204. Now, if the characteristic dimension h has a high value, i.e. of the order of the size of the actuator or the casing thereof, or exceeds it, the components 401, 402 can be arranged in such a way that the environment affects the radiation flux 403 through the active layer over the entire distance between said components 401 and 402, allowing to average the factors affecting the state of the environment and to make the excitation from the sensor member dependent on the average quantity values with the result that more reliable alarms are achieved.

In an environmental fuse according to an embodiment of the invention, the active layer 403 is arranged for a radiation flux that is a radiation flux of optic radiation, acoustic radiation and/or particle radiation. Thus, the radiation has a wave length and/or an amplitude. The radiation can be monochromatic and/or coherent but also radiation whose components have different wave lengths. According to one embodiment of the invention, the components 401 and 402 are only arranged to detect a radiation flux change related to a given wavelength in the active layer 403. An environmental fuse according to an embodiment of the invention may therefore have several, at least two different sensor members. If this is the case, one sensor member may be arranged to detect a component present in the composition of the operating environment of the actuator, based on absorption, for example.

FIG. 5 shows an integrated environmental fuse according to one embodiment of the invention. The sensor member has a combination of different electro-mechanical-chemical components. The connecting components E1, E2 and E3 are denoted in the same way as in FIG. 4 but in the integrated environmental fuse, in the combination sensor thereof according to FIG. 5, the connecting components E1, E2 and E3 may also act as corrosion sensors, for example. When the corrosion proceeds far enough, and when the connecting component E1, for example, is arranged to serve as the active layer 403 as well, for that part which is subjected to the corroding influence of the environment, the rupture of E1 through the influence of corrosion causes a current meter connected in series with E1 to show a change which, according to the tolerance of a norm, is interpretable as an excitation to the functional member 205 to generate a response by means of the component 408. E2 and E3 can be arranged in the same way as E1 but according to a different tolerance so that a graded alarm can be obtained from the environmental fuse, and the manufacturer of the device can conclude when a device having an environmental fuse according to FIG. 5 has to be serviced. In FIG. 5 three connecting components are described but their number is application specific and may thus differ from the shown number, even exceed it.

In the above example, it was mentioned in conjunction with E1 that corrosion changes its resistance, but FIG. 5 illustrates, by means of the following expression: $E1=E1 (D_1, R_1, 1_1, \ldots)$, other mechanisms of changing the properties of E1 through the influence of the environment. In this case, the structure of E1 is arranged such that a gas, an aerosol and/or a component thereof present in the composition of the environment and having a flux to the surface of E1 determined by the diffusion constant $D_1$, can deposit and/or diffuse into the structure of E1, changing its electric properties. In a corroding environment, even the width $1_1$ of the sensor member can change with time so that an excitation for the functional member 205 can be generated in order to generate a response, based on a current measurement and/or voltage measurement 404 of the voltage 406. This applies especially in cases where that part of E1 which acts as the active layer is made from a material that corrodes in the operating environment. The material can be a metal, polymer, ceramics and/or a combination of said materials, for example. In addition, corrosion may change the resistance R1 of the active layer, and/or the impedance that can be formed by means of it between given connecting layers.

In FIG. 5, the active layer 403 can be arranged such that it 403, instead of corrosion, can be based on the effect of an aerosol or a component thereof present in the environment. In this case, particles depositing onto the active layer of the sensor member change its electric properties with the result that the electric current running through the active layer changes detectably. Besides, a gas phase may react with the active layer, changing its electric properties. It should be noted that an exemplary case where microbes start building a bridge over an active layer clean to be mounted, between the connecting layers E1 and E2, is also considered changing of the active layer.

In FIG. 5, even the gaps between the components E1, E2 and E3 can act as active layers having a given characteristic dimension. Thus, the sensor structure according to FIG. 5 makes it possible to generate, using the same sensor, excitations according to different norms and/or suitable for different tolerances, as well as to grade them to give different alarms. Besides, it is possible to provide several similar gaps and/or components E1, E2 and E3 for a statistically more reliable excitation generation. The length, and/or another dimension, of E1, E2 and/or E3 can be defined based on the resistivity of each material, according to a given norm. For example, in order to create a stepped alarm threshold for the environmental fuse.

The expressions $E2=E2 (D_2, R_2, 1_2, \ldots )$ and $E3=E3 (D_3, R_3, 1_3, \ldots )$, in which the same notation as for E1 is used, can be understood as explained in the description of E1. The equivalent parts denoted by letters are the same quantities as those of E1 but they are adapted, as shown by the indices, for different parameter values, for a different norm and/or for a different component present in the composition of the environment. The components may have different geometric or characteristic dimensions in order to generate a different excitation corresponding to each characteristic dimension, for example.

FIG. 5 also shows the characteristic dimensions $h_{12}$ and $h_{23}$ corresponding to the distances between the connecting components E1, E2 and E3 denoted by numerals. In the Figure, $h_{12}$ is the distance between E1 and E2, while $h_{23}$ is the distance between E2 and E3. Based on the above description and especially on the explanation of FIG. 4, a person skilled in the art understands the connection between the characteristic dimensions stated in conjunction with FIG. 5, which relate to the supply of an electric flux through an active layer 403, and the material strength and/or geometry of the active layer corresponding to each of them.

Thus, if there are voltages and/or currents to be coupled between E1, E2 and E3, for example, different electric fields can be generated between E1, E2 and E3, in the active layers 403A and 403B therebetween, of which the active layer 403A and 403B are an active layer between E1 and E2 as well as between E2 and E3, respectively, by using a characteristic dimension $h_{ij}$, where i and j can assume values 1, 2 or 3, independently of each other. These layers can be identical but also unidentical when implemented with different characteristic dimensions and/or material choices; depending on whether the object is to achieve a redundant effect (several identical active layers) in the response generation or grading in the response (unidentical active layers).

Thus, through the mechanical dimensioning of the sensor member can be taken care of that the electric fields used therein are kept suitably sized, also with small voltages which are approximately of the same order as those needed to drive the actuator itself, or even smaller. This allows the use of even miniature-sized sensors with sufficiently small characteristic dimensions. Furthermore, this allows the creation of small, almost microscopic structures which can be used, in a statistically comprehensive number, graded and/or in parallel redundantly, arranged into a combination sensor, for example, for a reliable detection of a change in the environment.

Furthermore, it is possible to arrange a component E1, E2, E3 of the sensor of an environmental fuse according to one embodiment of the invention as a part of a measuring bridge, for example, and to use said part of the bridge in the sensor subjected to the environment and another corresponding part as a reference part according to bridge measuring principle, protected from the environment, both of them being dimensioned according to a given norm. In this case, the bridge measurement can be based on a sensor having capacitance, inductance and/or resistance formed as part of the measuring bridge by means of one component E1, E2, E3.

Figure 6:
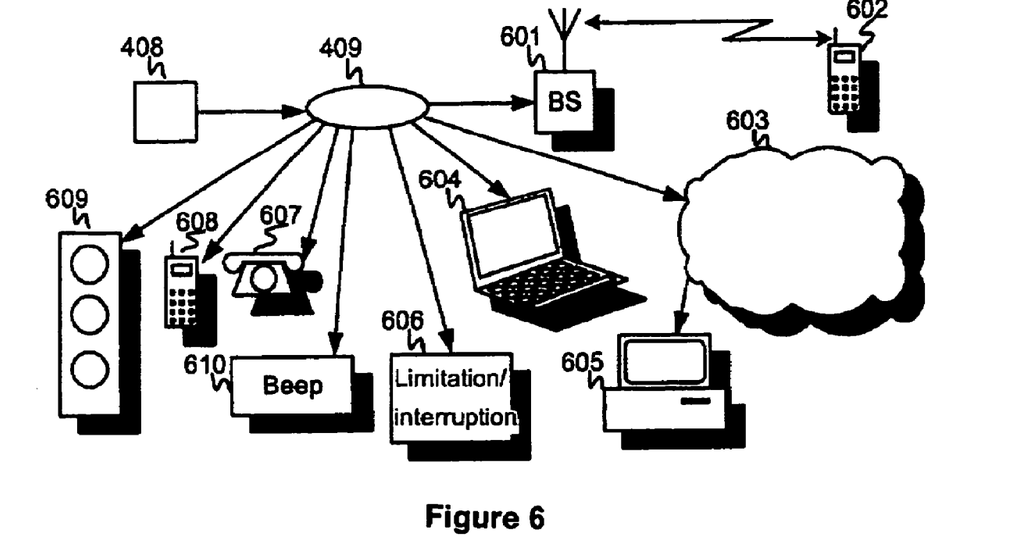
FIG. 6 illustrates the functions of an environment-related according to an embodiment of the invention.

FIG. 6 illustrates the use of an environment-related use to generate an alarm in order to prevent the actuator from failing.

When the alarm 409 is given from the component 408 of the functional member 205 of the environmental fuse, the functional member must be arranged capable of generating one of the alarms mentioned in conjunction with FIG. 6, but most preferably case-specifically as such a combination of the alarms mentioned in conjunction with FIG. 6 that is preferred in view of the service of the actuator. FIG. 6 is an illustrative example on how the functional member in environmental fuses according to one embodiment of the invention is arranged to give an alarm, to limit, and/or to interrupt the operation of the actuator with the aid of interruption means 606 (a relay arrangement or the like, for example). A case where the operation of the environmental fuse prevents the actuator from starting is also considered an interruption. The example of FIG. 6 is not intended to pose any restrictions on the alarm per se or on the functional member. A person skilled in the art knows, based on the invention, how the functional member can be arranged to generate a given alarm.

FIG. 6 shows a base station 601 which is used in wireless communication, e.g. in cellular systems, to transmit messages to a maintenance person's mobile phone 602, for example. Another way of transmitting of an alarm is the use of a data network 603 to transmit it to a terminal 605, and/or a data network, of the manufacturer of the actuator. Still another way of transmitting an alarm is to transmit it to a terminal 604 of the operating manager who is responsible for the operation of that actuator whose environmental fuse gave the alarm. Although the terminal 604 is shown to be computer, this is not done with the intention of limiting the transmission to data transmission based on a WLAN or a corresponding wireless network, but even other data transmission principles are feasible. Besides, a light panel 609 can be used to indicate an alarm in a noisy environment, for example. Furthermore, a sound signal 610 can be given in an environment where it probably will be heard. Finally, a conventional telephone network 607 and/or a wireless extension 608 of such a network can be used to transmit an alarm.

Figure 7:
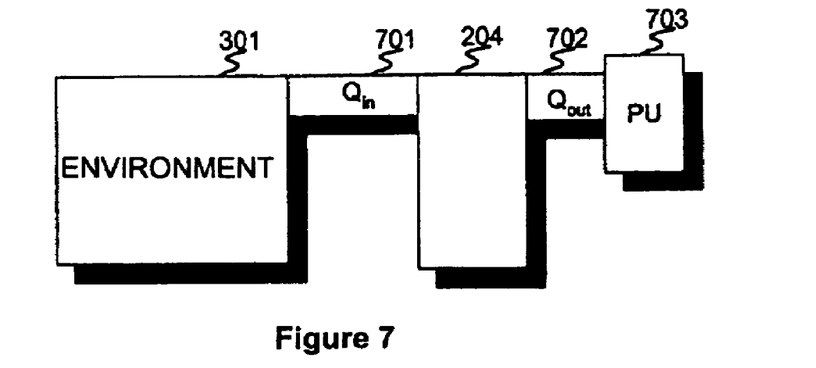
FIG. 7 illustrates a collecting arrangement according to an embodiment of the invention which contains an environmental fuse according to the invention.

FIG. 7 illustrates the subjection of the sensor member 204 of an environmental fuse according to one embodiment of the invention to factors affecting the state of an environment 301. In this case, a flow 701 from the environment 301 is generated by means of a fan and/or pump 703, for example, as a result of which the gases and/or aerosol particles carried by the flow come into contact with the sensor member 204 and thus with the active layer (not shown in FIG. 7). The flow 702 is an outflow into which the flow is guided after the sensor member 204. The arrangement shown in FIG. 7 should be understood in such a way that the fan 703, the sensor member 204 and/or the channels guiding the flows 701 and 702 alternatively may be disposed, partly or entirely, in a location in the environment 301, where applicable. The flows 701 and/or 702 may alternatively be generated without an actual bordered channel structure, e.g. by means of a fan or the like placed in connection with the actuator.

Figure 8A:
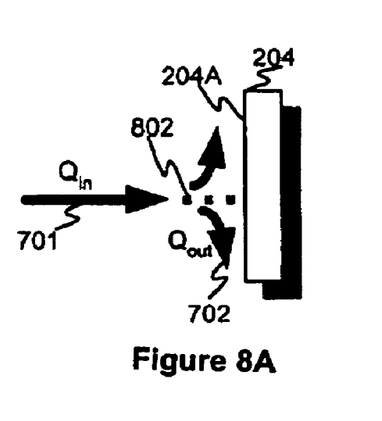
FIG. 8A illustrates an environmental fuse sensor member according to an embodiment of the invention in an impaction geometry.

FIG. 8A illustrates a collecting arrangement in combination with an environmental fuse according to one embodiment of the invention. The sensor member 204 of the environmental fuse according to this embodiment of the invention is arranged in an impaction geometry, for example, wherein the surface 204A of the sensor member has an active layer (403 in FIG. 4, for example) whose electric changes are observed as shown in FIGS. 4 and 5. FIG. 8A shows the sensor member 204 as if seen from the side, meaning that it may have either a plane-like and/or a wire-like active layer to which the flow 701 is perpendicular or substantially perpendicular. In the impaction geometry, the active layer can develop gradually from particles carried to the surface of the sensor member by the flow, for example, so that any changes caused by them are detectable. The particles may be solid and/or liquid. Besides, a gaseous substance may collide with the active layer, reacting to it and causing detectable changes with time.

According to an embodiment of the invention, the sensor member can be arranged such that water which has condensed into a liquid from a gaseous phase, for example, when its content in the flow 701 deviates from a norm, can be detected either as such or condensed onto the surfaces of dust particles. Thus, the particles carried by the flow 701 can be brought to collide with a collecting substrate arranged conveniently on the sensor member, in order to generate an alarm referring to a content deviating from the norm. In this case, impaction can be used to separate the gaseous and particulate components of the composition of the environment from each other. Each component may have its own sensor member.

Figure 8B:
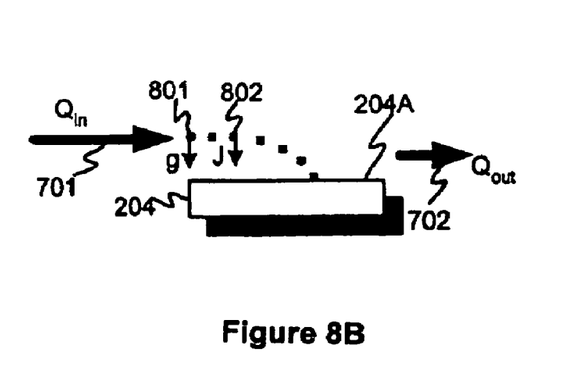
FIG. 8B illustrates an environmental fuse sensor member according to an embodiment of the invention in a deposition- and/or interception geometry.

FIG. 8B illustrates a collecting arrangement in combination with an environmental fuse according to one embodiment of the invention. The sensor member 204 of the environmental fuse according to this embodiment of the invention is arranged in an interception geometry, for example, wherein the surface 204A of the sensor member has an active layer (403 in FIG. 4, for example) whose electric changes are observed as shown in FIGS. 4 and 5. FIG. 8B shows the sensor member 204 as if seen from the side, meaning that 204 may have either a plane-like and/or a wire-like active layer, the flow 701 being thus parallel with the surface 204A of the sensor member 204 over a distance. Therefore, at least a part of the flow 701 runs in the immediate proximity of the surface 204A, sort of skimming it, the particles of the flow having a flux according to the different particle collecting mechanisms to the surface 204A.

In FIG. 8B, the spot-like structure units 801 and 802 illustrate the settling of a material flow, which arrives with the flow from the environment, on the surface 204A. There may be several settling mechanisms which affect the different components of the composition of the environment. FIG. 8B illustrates settling due to gravitation g for a particle 801 that arrived with the flow 701 from the environment 301 (FIG. 7). The numeral 802 denotes a particle and/or structure unit, present in the composition of the environment, which has a diffusion constant D (cfr. FIGS. 4, 5) and thus a flux J from the flow 701 to the surface 204A. Therefore, the structure unit may be a gas molecule, ion or an aerosol particle but also a combination of them. Of course, it is obvious for a person a skilled in the art, based on the invention, that gravitation and diffusion, for example, affect the structural components of the composition differently. Consequently, the structure units 801, 802 can be separated using different sensor members on the surface 204A to collect each structural component of a given type present the composition of the environment on the surface 204A, as is shown in FIG. 5, for example. FIG. 8A and FIG. 8B show, as examples, a situation in which the surface 204A is perpendicular to the flow and a situation in which the surface 204A can be parallel with the flow, respectively. However, the above-given examples are not intended to exclude such embodiments of the invention in which a portion of the surface 204A is inclined with respect to the flow and in which the surface 204A is curved, cylindrical or spherical, for example.

Figure 8C:
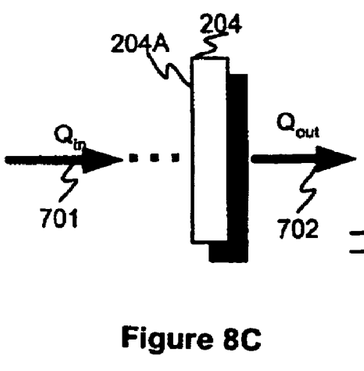
FIG. 8C illustrates an environmental fuse sensor member according to an embodiment of the invention in a mechanical filter geometry.

FIG. 8C illustrates a collecting arrangement in combination with an environmental fuse according to one embodiment of the invention. The sensor member 204 of the environmental fuse of this embodiment comprises a sensor member 204 which is of the filter type, for example, wherein the active layer (403 in FIGS. 4 and 5) lies on the surface 204A of the sensor member 204. The structure of the filter as such is not commented on but it may be arranged to optimize a given filtering mechanism, e.g. to collect impurities of a certain size from the environment. In this case, the active layer is formed on the surface of the sensor member 204. This filter-type solution as the sensor member 204 is also suitable for collecting liquid impurities into a porous filter structure. In this case, the active layer is formed in the inner structure of the filter itself. Thus, it is preferable to arrange the collecting system in a stack geometry, at least partly.

Figure 8D:
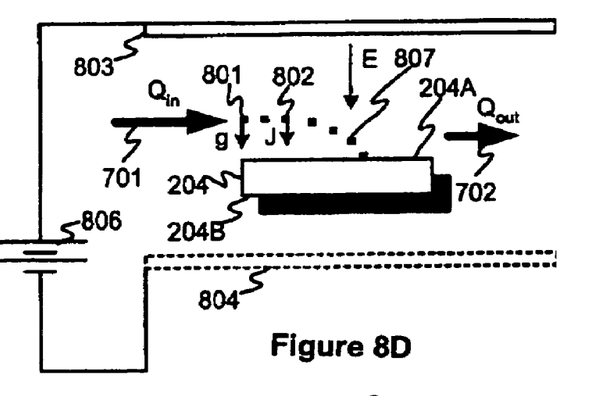
FIG. 8D illustrates an environmental fuse sensor member according to an embodiment of the invention in an electric filter geometry.

FIG. 8D illustrates a collecting arrangement in combination with an environmental fuse according to an embodiment of the invention. The sensor member of the environmental fuse according to this embodiment of the invention is arranged, for example, in an interception geometry, in the same way as in FIG. 8B, but FIG. 8D also shows the effect of an electric field E on the structural component 807. In order to generate the electric field E, to collect the structural component 807 arriving with the flow 701 from the environment on the surface 204A of the sensor member 204, electrodes 803 and 804 are connected to an electricity source 806 which can be a DC source, AC source or pulsable electricity source. The collecting can be based on the interaction between the electric field E and a charge in the structural component 807 but also on the so-called secondary flow phenomenon known from conventional electric filters. By drawing the electrode 804 as a dashed line is illustrated that the surface 204A itself, the surface 204B opposite to it or the sensor member 204 can function as the electrode 804. In this case, the component that functions as an electrode has to be electrically connected to the electricity source 806, even though the sensor member 204 in FIG. 8D seems to be floating in the field between the electrodes 803 and 804.

Figure 8E:
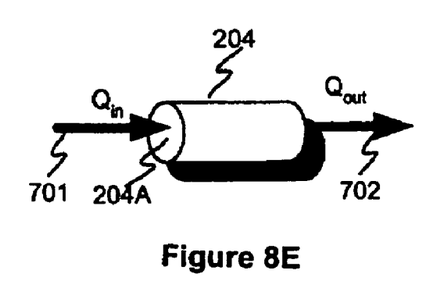
FIG. 8E illustrates an environmental fuse sensor member according to an embodiment of the invention in a curved interception geometry.

FIG. 8E illustrates embodiments of the invention that deviate from the plane-geometric sensor member designs and have some other than a filter geometry as the geometry between the flow and the sensor member 204.

FIG. 8E illustrates collecting arrangements according to some embodiments of the invention in combination with environmental fuses. The sensor member of an environmental fuse according to one embodiment of the invention is now arranged, for example, such that the surface 204A of the sensor member is reversed to the inner wall thereof in order to create a flow channel. Although the sensor member 204 is shown to be a hollow cylinder in the Figure, it 204 can alternatively be angular in order to achieve a given flow property by means of the channel.

Figure 8F:
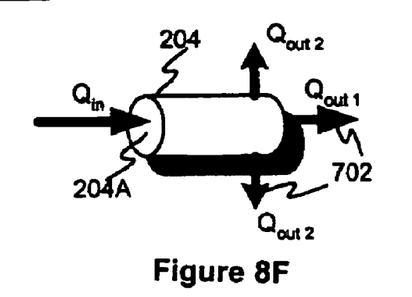
FIG. 8F illustrates an environmental fuse sensor member according to an embodiment of the invention in a curved filter geometry.

FIG. 8F, on the other hand, illustrates embodiments of the invention which are in accord with FIG. 8E except for the fact in them a filter-geometric sensor member 204 is turned to the inner wall in order to create a flow channel. In FIG. 8F, the flow 702 is denoted by three different arrows, but a person skilled in the art knows, based on this description, how to divide the flow 702 between these three arrows in a way that is optimum for the actuator application of the environmental fuse.

If necessary, the arrangements according to FIGS. 8A-F can be combined in order to collect given components of the composition of the environment on a specific substrate. Thus, one of said collecting arrangements can be used in an environmental fuse according to a first embodiment of the invention. Thus, another of said collecting arrangements can be used in an environmental fuse according to a second embodiment of the invention.

A person skilled in the art knows what a short-circuit of an actuator and the resulting fire can cause in the worst case in a mill, for example. The biological state of the environment in a food factory, for example, can be such that certain microbes may, for example, grow in the insulations of an actuator and/or even eat or corrode them, causing possibly a short-circuit and destruction of the actuator. Humidity can also change adversely under such conditions when the biological state of the operating environment changes. In this case, an environmental fuse according to an embodiment of the invention can be provided with a sensor member whose excitation generation is set to take place when a given deviation from the tolerance of a norm 206 corresponding to the actuator of the food factory occurs.

In order to detect changes in the biological state of the operating environment, the sensor member of an environmental fuse according to an embodiment of the invention is treated with a substance affecting the reproduction of a micro-organism which can be one the following: bacterium, virus and fungus. Besides, several substances can be arranged in different parts of the sensor in order to enable a detection by means of each of them, based on a different norm and/or content, for example.

Figure 9:
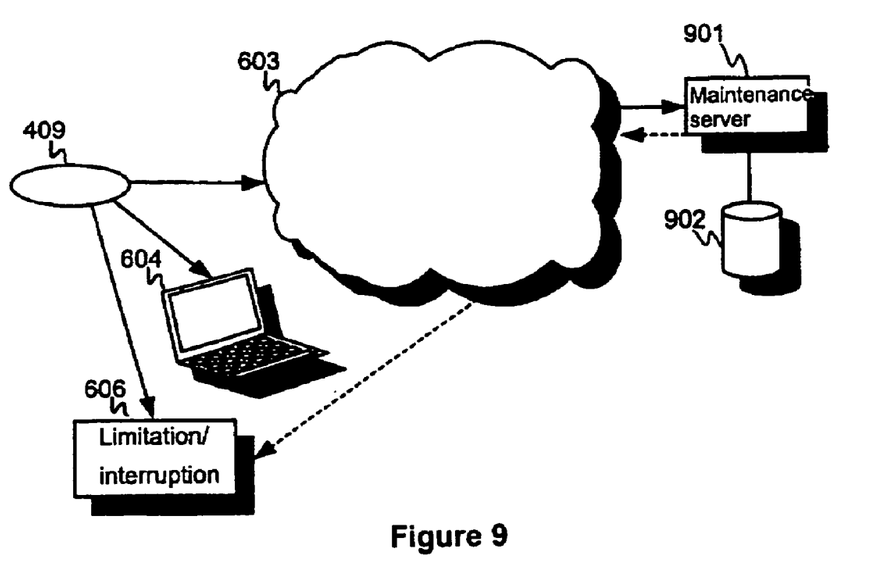
FIG. 9 illustrates a maintenance server according to one embodiment of the invention.

FIG. 9 shows a maintenance server 901 according to an embodiment of the invention combined with data base means 902 which are intended for storing information related to services but which also can be used in the establishment of a norm. Most preferably, the maintenance server 901 can be implemented with software means, in conjunction with a larger actuator, or a control computer or the like which controls a group of actuators, for example, but also in a server belonging to the manufacturer of the actuator. Besides, the data base means 902 preferably contains recorded information about alarms 409 caused by environmental fuses 202 (FIG. 2), and possibly even information about excitations generated within the environmental fuses, about the responses thereto, and/or about the responses to the alarms, to be transmitted to the maintenance server. The responses may contain service and/or operating instructions to be transmitted from the manufacturer of the actuator to computers 604 of the operating personnel via a data network 603. The responses may also contain instructions for controlling the component 408 of the functional member 205 of an environmental fuse for limitation and/or interruption measures in order to limit and/or interrupt the supply 203 by means of interruption means 606. The dashed-line arrows between the maintenance server 901, data network 603 and interruption means illustrate the forced control of the component 408 of the functional member 205 via the maintenance server.

According to a preferred embodiment of the invention, an actuator, a member and/or actuator controller thereof, for example, can be provided with its own operating environment whose state is observed by means of an environmental fuse. If the operating environment does not meet the requirements of the norm, because of a power failure or a similar obstacle, for example, that prevents the operating environment from keeping within the tolerance of the norm, the environmental fuse limits and/or interrupts the supply to the actuator. As an alternative to interruption, the environmental fuse may be arranged to trigger a response that tries to compensate for the change in the environment. An environmental fuse according to this embodiment of the invention is especially useful in actuators having an air bearing, for example. In this case, the response may comprise opening of an emergency reservoir in order to supply air and to maintain the operating environment thereby.

An environmental fuse according to an embodiment of the invention is arranged removable from the actuator itself, even when it is an integrated one and intended to be mounted therein permanently. Thus, the environmental fuse is replaceable with a new one. The environmental fuse is and/or has a modular part, meaning that the entire fuse or the sensor member, for example, is replaceable with a new similar one. If this is the case, the environmental fuse must have, in order to prevent possible misuses, identification and/or memory means to ensure that exactly a given environmental fuse has been used in the right environment in combination with its actuator. The identification itself may be based on the use of a technique known per se. It is even possible to provide the actuator itself, the controller and/or environmental fuse thereof, with a memory where information necessary for the identification, concerning the event wherein the environmental fuse was taken into use and/or possible interruptions in its use due to services, for example, can be stored. According to one embodiment of the invention, the actuator, the controller and/or environmental fuse thereof can be provided with a SIM card or the like, for example. Furthermore, it is possible to compare information from the environmental fuse, which is obtainable via a maintenance server according to one embodiment of the invention, with information stored by the environmental fuse, actuator and/or the controller thereof. Thus, the possessor of the actuator cannot claim that there never have been any environment-related problems, since the information transmitted and/or stored by the environmental fuse proves that something suspicious has happened.

The invention claimed is:

1. A method of protecting an actuator against failure, comprising:
    establishing a norm of factors affecting an operation of the actuator as based on an operating environment of the actuator;
    providing the norm with a tolerance defining a condition for the operation of the actuator in the operating environment;
    observing the operating environment of the actuator in order to detect a deviation that falls outside said tolerance, the observation being performed by an environmental fuse comprising a sensor member with a first connecting surface and a second connecting surface for feeding a flux through an active layer disposed between the first connecting surface and the second connecting surface, wherein the active later is arranged to cause a change in the flux's passing through the active layer when
    cumulatively subjecting the active layer to a component present in the operating environment, and
    limiting and/or interrupting a supply to the actuator when said deviation falls outside said tolerance for the operation.

2. A method as defined in claim 1, wherein the method further comprises generating an excitation signal by said sensor member.

3. A method as defined in claim 1, wherein the method further comprises generating a response by a functional member of the environmental fuse, in response to an excitation signal.

4. A method as defined in claim 3, wherein said response comprises a function in which the supply to the actuator is limited and/or interrupted.

5. A method as defined in claim 3, wherein said response comprises an alarm function.

6. A maintenance server comprising a block configured to process and store information concerning an alarm from an environmental fuse and/or for generating a response in order to limit and/or interrupt the supply to that actuator whose environmental fuse is the source of the alarm, wherein said environmental fuse has a sensor member with a first connecting surface and a second connecting surface for feeding a flux through, an active layer disposed between the first and second connecting surfaces, wherein the active layer is arranged to cause a change in the flux's passing through the active layer when cumulatively subjected to a component present in the operating environment, and a block configured to limit and/or interrupt a supply to the actuator, in order to keep the actuator in a working order.

7. A maintenance server as defined in claim 6, comprising software as an implementation.

8. A maintenance server as defined in claim 6, comprising a block configured to report alarm information to a data network.

9. A maintenance server as defined in claim 8, wherein said data network comprises one or a combination of the following: Internet, a local network, and a network based on a cellular system.

10. An environmental fuse for protecting an actuator against failure, the environmental fuse comprising a sensor member to detect a change that occurs in an environment and deviates from a tolerance according to a norm, and a functional member having a block configured to limit or interrupt the supply to the said actuator and/or to give an alarm, said environmental fuse further comprising a sensor member having a first connecting surface and a second connecting surface for feeding a flux, an active layer disposed between the first and second connecting surfaces, wherein the active layer is configured to cause a change in the flux's passing through the active layer when cumulatively subjected to a component present in the operating environment.

11. An environmental fuse as defined in claim 10, further comprising a collecting arrangement for collecting a component present in the composition of the environment.

12. An environmental fuse as defined in claim 11, wherein said collecting arrangement is based on the collection of a component present in the environment on a substrate through diffusion, electrical interaction, impaction, interception, filtering and/or deposition.

13. An environmental fuse as defined in claim 11, wherein the collecting arrangement comprises a collecting substrate comprising a wire, strip, dielectric substrate, conductive substrate and/or filter.

14. An environmental fuse as defined in claim 10, wherein the sensor member is configured to detect particulate material, gas and/or moisture.

15. An environmental fuse as defined in claim 10, wherein said flux comprises a flux of electric current.

16. An environmental fuse as defined in claim 10, wherein the change in said flux's passing is based on a change of the opacity of a medium and/or an interface thereof.

17. An environmental fuse as defined in claim 16, wherein said flux comprises a flux of radiation.

18. An environmental fuse as defined in claim 10, wherein said actuator comprises a controller of another actuator.

19. An environmental fuse as defined in claim 10, wherein the environmental fuse comprises:
a first component of the sensor member to detect a first change that occurs in the environment and deviates from a first tolerance according to a norm, and
a second component of the sensor member to detect a second change that occurs in the environment and deviates from a second tolerance according to a norm.

20. An environmental fuse as defined in claim 19, wherein said first component and second component of the sensor member are integrated into an integrated sensor member.

21. An environmental fuse as defined in claim 10, wherein the environmental fuse comprises:
a first functional member having functional configured to limit and/or interrupt a first part of the supply to the actuator to be protected and/or to give an alarm, and
a second functional member having functional configured to limit and/or interrupt a second part of the supply to the actuator to be protected and/or to give an alarm.

22. An environmental fuse as defined in claim 10, wherein the environmental fuse has a modular component to be replaced with another similar component.

23. An environmental fuse as defined in claim 22, wherein the modular component of the environmental fuse comprises the sensor member.

24. An environmental fuse as defined in claim 10, wherein the environmental fuse comprises a memory for storing one or more of an environment, actuator, norm, and a quantity value dependent on the state of the environment.

25. An environmental fuse as defined in claim 10, wherein the environmental fuse comprises one or more of a memory for authenticating an environment, actuator, norm, and a quantity value dependent on the state of the environment.

26. An environmental fuse as defined in claim 10, wherein the sensor member of the environmental fuse comprises an active layer having one or more of a capacitance, an inductance, and a resistance.

27. An environmental fuse as defined in claim 26, wherein said active layer is configured to form part of a measuring bridge.

28. An actuator, wherein the actuator comprises the environmental fuse according to claim 10.

29. An actuator as defined in claim 28, further comprising one or more of an electric drive, power supply, drive controller, pump, and fan.

* * * * *